July 5, 1932. H. NIEDERREITHER 1,865,946
DECOMPOSER, PARTICULARLY FOR THE ELECTROLYSIS OF WATER UNDER PRESSURE
Filed Aug. 13, 1930
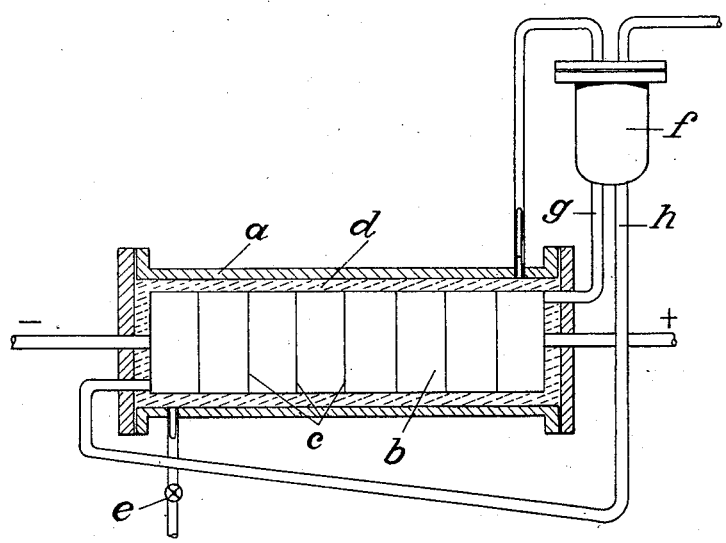

Patented July 5, 1932

1,865,946

UNITED STATES PATENT OFFICE

HANS NIEDERREITHER, OF MUNICH, GERMANY, ASSIGNOR TO LAWACZECK GESELL-SCHAFT MIT BESCHRANKTER HAFTUNG, OF BERLIN, GERMANY

DECOMPOSER, PARTICULARLY FOR THE ELECTROLYSIS OF WATER UNDER PRESSURE.

Application filed August 13, 1930, Serial No. 474,952, and in Germany October 2, 1928.

Pressure decomposers, particularly when a compact form of construction is aimed at, have, as a rule, a pressure-tight casing in the interior of which the parts which co-operate in the decomposition process are arranged, packed together as closely as possible, after the fashion of filter presses, for example. The hollow space between this internal structure and the pressure vessel is, according to the present invention, filled up with an insulating material, such as hydrocarbon (asphalt, paraffin wax or the like) which is in a fluid state at least at the working temperature of the apparatus and in this state is lighter than or heavier than the electrolyte. The internal structure cannot, in practice, be made so fluid-tight that electrolyte will not leak through the joints where the various parts of the said structure abut one against the other. Such leakage would cause the hollow space between the inner structure and the pressure vessel to become gradually filled with electrolyte and consequently the insulation of the inner structure would disappear. If, however, the pressure decomposer be constructed according to this invention, any electrolyte leaking out from the internal structure will descend or ascend through the liquid insulating composition situated between said internal structure and the pressure vessel, according as the insulating composition has a lower or higher specific gravity than the electrolyte. The decisive factors for the complete insulation of the internal structure are, therefore, that the insulating medium shall be liquid at least at the working temperature of the apparatus and that it shall be lighter than or heavier than the electrolyte when in this liquid state. The electrolyte which leaks out from the internal structure collects, after passing through the liquid insulating composition, either at the bottom or at the top thereof and can be run off by cocks or the like from the points where it has collected.

It is of course known per se to insulate the various parts of a pressure vessel from each other or from the electrolyte. On the other hand hydrocarbons of comparatively low melting point, particularly paraffin wax and asphalt have already been in common use as insulating media. They have, however, always been used as solid insulating media, that is to say, at temperatures which lie below their melting points. In high pressure decomposers only hard materials such as porcelain, hard rubber or the like have regularly been used exclusively as insulating media.

The filling material introduced according to the present invention between the internal structure and the pressure vessel must naturally possess insulating properties, but this does not by any means exhaust its functions, which include, on the contrary, as above pointed out, the feature that the substance must be liquid at working temperatures and must act while in this state as a means for the displacement of the liquid which has oozed out of the internal structure. It must therefore possess the properties above described.

One of the numerous possible constructional forms of apparatus in accordance with the invention is illustrated, by way of example, in the accompanying drawing which is a partial longitudinal section.

In the interior of the pressure vessel $a$ is located the decomposer body $b$ constructed it may be, after the fashion of a filter press. Thus unit $b$ may consist of a number of cylindrical bodies which abut against each other at the joints $c$, which latter can only with considerable difficulty be kept perfectly fluid tight. The electrolyte, which runs out at the leaky places, would gradually fill up the space between the body $b$ and the pressure vessel and, consequently would destroy the insulation of the various parts of the internal body $b$ and also insulation of this body $b$ from the pressure vessel $a$.

In order to prevent this the hollow space $d$ is filled up, according to this invention, with an insulating medium such, for instance, as asphalt, paraffin wax or the like, which, either at all times or, at least, at the working temperature of the pressure decomposer is liquid and, in this state, is lighter than or heavier than the electrolyte. If the insulating filling composition in the space $d$ is lighter, the electrolyte which drips from the joints $o$ collects at the bottom of the pressure vessel and can be continuously or periodically run off by means of the cock $e$. A vessel $f$ for the supply of the electrolyte may be conveniently provided and kept at the pressure prevailing in the inner structure $b$ by suitable connections $g$ and $h$.

What I claim is:

The process of electrolyzing an aqueous solution under high pressure which consists in conducting the electrolysis in a decomposing chamber containing a hydrocarbon insulating means disposed between the walls of such chamber and the groups of electrodes, the said hydrocarbon being in a liquid state at least at working temperatures.

In testimony whereof I have affixed my signature.

HANS NIEDERREITHER.